Figure 1:
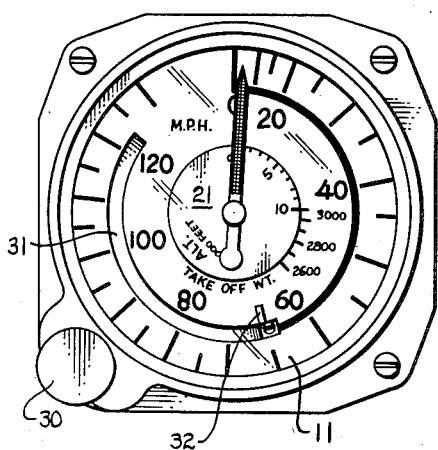

April 1, 1958

C. M. SEIBEL 2,828,916

MAXIMUM SAFE SPEED COMPUTER FOR HELICOPTER

Filed Oct. 31, 1956

INVENTOR.
CHARLES M. SEIBEL
BY Hubert Miller
ATTORNEY

United States Patent Office 2,828,916
Patented Apr. 1, 1958

2,828,916

MAXIMUM SAFE SPEED COMPUTER FOR HELICOPTER

Charles M. Seibel, Wichita, Kans., assignor to Cessna Aircraft Company, Wichita, Kans., a corporation of Kansas Application October 31, 1956, Serial No. 619,499

7 Claims. (Cl. 235—83)

The invention described herein relates generally to aircraft instruments and specifically to a safe speed computing and indicating instrument whose readings are based on the combined factors of gross weight and altitude at the time during flight when a specific reading is taken, and the relationship of those factors to blade angle of attack and to the rotational speed of the helicopter rotor.

During translational flight the bladed lifting rotor of a helicopter is necessarily moved through the air edgewise. The blades on one side of the line of flight are thus advancing "into the wind" while the blades on the opposite side are moving "downwind." Unless the blades on both sides of the fuselage produce substantially the same amount of lift simultaneously there is no lateral balance. To substantially equalize the lift on both sides the blades moving "downwind" must operate at a higher angle of attack in order to increase the lift which they produce, because of the lower relative airspeed between the blades and the air through which they are moving.

As the forward airspeed of the helicopter as a whole increases, and the angle of attack of the "downwind" traveling blades is increased to maintain lateral balance, these blades reach their stall angle of attack. As this condition is approached vibration over the entire helicopter increases, the power and rotor R. P. M. required to maintain level flight increases, and if the translational speed is increased sufficiently, control of the helicopter is lost.

Assuming constant rotor R. P. M. and blade area, the translational speed at which blade stall occurs is a function of air density and total flight weight of the helicopter. Air density decreases with increase in altitude. At higher altitudes, then, the rotor blades must operate at higher angles of attack to produce the required lifting force. At higher altitudes there is therefore less blade angle of attack range between the average flight angle and blade stall angle. In other words the maximum safe translational airspeed of the helicopter is reduced as altitude increases. Increase in the total flight weight of the helicopter also causes the rotor blades to stall at lower translational airspeeds, and hence reduces the maximum safe airspeed, independent of altitude.

Through a series of flight tests it is possible to determine the maximum safe airspeed for any specific helicopter at various altitudes and with various total gross flight weights. In the past the Civil Aeronautics Administration has not permitted the use of both these variables in determining maximum permitted airspeeds because of the extreme complexity of quickly conveying such information to the pilot during flight. Instead, CAA has assumed that the particular helicopter will always fly at maximum gross weight, and has allowed the pilot to vary his maximum airspeed only with changes in altitude. This arbitrary method has penalized helicopter performance because, aside from emergencies, helicopters are seldom flown at maximum gross weight. Under normal conditions then, most helicopters could safely fly at higher maximum airspeeds than are permitted by the CAA flight certification.

It is a prime object of this invention to provide a flight instrument which is capable, through manipulation, of instantly apprising the pilot during flight of the maximum safe permitted airspeed with the particular gross weight at which he is flying and at the particular altitude at which he is flying. The instrument eliminates need for calculations by the pilot, reference to charts, etc.

It is a further object of the invention to provide an instrument which will permit flight certification authorities to safely establish a wider range of permitted airspeeds for a specific model helicopter, based on all conditions of gross weight and altitude.

Figure 2:
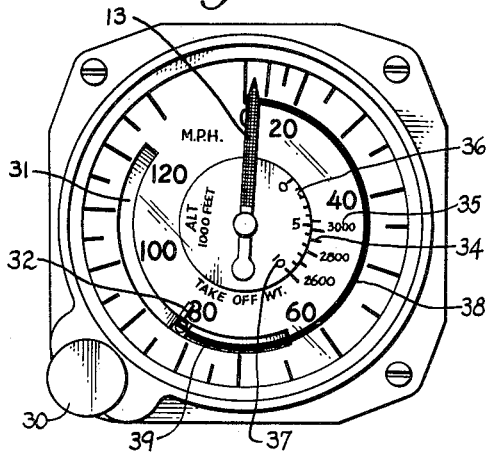
Figure 3:
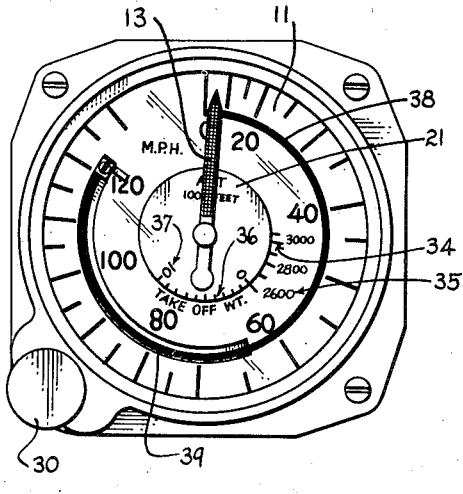
Figure 4:
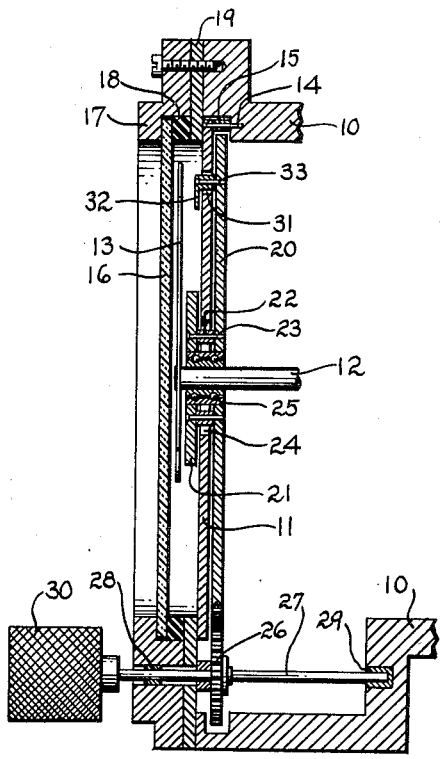

The invention together with other objects attending its production will be more clearly understood when the following description is read in connection with the accompanying drawings, in which:

Figs. 1, 2 and 3 are front views of the instrument face illustrating settings for different gross weight and altitude conditions of a helicopter; and Fig. 4 is a fragmentary central transverse sectional view illustrating details of construction of the invention.

It should be initially understood that the invention is intended to be combined with and cooperate with a conventional airspeed indicating instrument. The mechanism of this invention and a portion of the mechanism of a conventional airspeed indicator are simply combined to create a new instrument.

Since the mechanism of an airspeed indicator is old and well known, its construction details have been omitted in the drawings and only those parts necessary to the understanding of this invention have been shown.

Referring to Fig. 4, the instrument housing is indicated by the numeral 10, the airspeed dial by the numeral 11, the airspeed indicator shaft by the numeral 12, and the airspeed sweep pointer or needle by the numeral 13. The dial face is provided with numerals and circumferentially spaced marks designating airspeeds from 0 to 130 M. P. H., as clearly shown in Figs. 1–3. Dial 11 is secured against movement in the housing by means of a plurality of circumferentially spaced screws or pins 14, which pass through registering apertures in the dial and in a spacer ring 15. The dial face and indicating needle are protected by a transparent crystal 16, held in place by a bezel 17, and gasket rings 18 and 19.

The invention includes a rotor assembly which is rotatable about the shaft 12 as an axis. This assembly comprises a large diameter gear 20 rotatable in a plane immediately adjacent the aft face of airspeed dial 11, and a smaller diameter altitude dial 21 which is rotatable in a plane immediately adjacent the front face of dial 11.

Gear 20 and dial 21 are secured together by means of a spacer ring 22 and spaced screws or pins 23 which pass through registering perforations in dial 21, ring 22, and gear 20. Ring 22 and pins 23 rotate in a relatively large diameter central opening 24 in air speed dial 11. The entire rotor assembly is supported by a central bearing 25, the inner race of which is supported by air speed shaft 12. The rotor assembly and shaft 12 are thus independently rotatable.

A pinion gear 26 is keyed to a shaft 27, which is journaled by bearings 28 and 29 in housing 10. One end of the shaft projects from the front face of the instrument and is fitted with a shaft turning knob 30. Thus when knob 30 is turned, gear 26 drives gear 20, and altitude dial 21 is rotated with relation to airspeed dial 11.

Air speed dial 11 is provided with a through arcuate slot 31 which is concentric to and is located between the peripheries of the two dials 11 and 21. One end of slot 31 terminates at a point near the lowest safe airspeed for the helicopter on which the instrument is to be used, and the other end of the slot terminates at a point near the highest safe airspeed, both as determined by flight tests and as indicated by the airspeed indicia on dial 11. A sweep pointer 32 is secured to gear 20 by means of a pin or rivet 33. This pointer 32 projects through the arcuate slot 31 and travels in this slot as gear 20 is rotated. The pointer 32 is adapted to register with selected ones of the air speed designating marks on the face of dial 11 as knob 30 is turned.

In addition to the airspeed indicia on the face of dial 11, its face is also provided with arcuately arranged spaced marks 34 and cooperating numerals 35 which designate various gross weights at which the helicopter may operate, preferably in 100 pound increments. These marks 34 are located immediately adjacent the periphery of altitude dial 21 and are adapted to cooperate with spaced altitude indicating marks 36 on the face of dial 21 near its periphery. The marks 36 are preferably in 1000 feet increments and are identified by numerals 37. Numerals 35 and 37 are arranged in reverse order, so that numerals 35 increase in a counterclockwise direction while numerals 37 increase in a clockwise direction about the rotor assembly axis. The angular location of sweep pointer 32 with respect to the location and spacing of the altitude indicating marks 36 is determined by data obtained by actual flight tests of the helicopter on which the instrument is to be used.

Operation

Referring to Fig. 3, if the helicopter is flying at its lightest gross flight weight of 2600 pounds, and is flying at sea level, the pilot rotates knob 30 until the altitude indicating numeral "0" registers with the gross weight indicating numeral "2600." During this rotor movement pointer 32 has moved into registry with one of the marginal air speed indicating marks on dial 11, and indicates to the pilot that his permitted airspeed under the conditions mentioned is approximately 123 M. P. H.

Referring to Fig. 2, if the helicopter is flying at a gross weight of 2600 pounds, but is flying at an altitude of 10,000 feet then knob 30 is rotated to bring the numerals "10(000)" and "2600" into registry, as shown, and the pilot sees instantly that his permitted indicated airspeed under these conditions is approximately 83 M. P. H., as indicated by pointer 32. This same dial setting and indicated airspeed would govern if the helicopter was flying at a gross weight of 3050 pounds and at an altitude of 5,000 feet, or at a gross weight of 2850 pounds, and at an altitude of 7,000 feet.

Fig. 1 illustrates the dial setting when the helicopter is flying at its maximum gross weight of 3100 pounds and at its ceiling altitude of 10,000 feet. Under such conditions pointer 32 indicates to the pilot that he should not exceed an indicated airspeed of approximately 65 M. P. H.

As an additional signal to the pilot that his airspeed should be kept within safe limits under any and all gross weight and altitude conditions an arcuate yellow line 38 is placed on dial 11 to indicate speeds below normal cruising range, and an arcuate green line 39 of the same radius is placed on the face of gear 20 to indicate normal cruising range. These two lines should be concentric with each other and with slot 31, and if all three are of the same radius, then green line 39 will form a continuation of yellow line 38 as knob 30 is turned to set dial 21, as clearly shown in Figs. 2 and 3. The pilot knows that so long as the airspeed indicating needle 13 lies within the angular space defined by the green line his helicopter is flying at a safe air speed, for a selected gross weight and altitude.

Having described the invention with sufficient clarity to enable those familiar with this art to construct and use it, I claim:

1. A helicopter maximum safe speed computing and indicating instrument comprising: a conventional air speed indicator which includes a housing, a fixed air speed dial bearing marginally located air speed indicia on its visible face, a central shaft projecting centrally through the dial and actuated by airspeed indicating mechanism within the housing, and an indicating pointer mounted on the projecting end of the shaft for registry with said air speed indicia to indicate air speeds; a circular altitude dial smaller in diameter than said air speed dial; means rotatably mounting said altitude dial in said housing in a position concentric to and immediately adjacent the visible face of the air speed dial; registerable cooperating gross weight indicia on the face of the air speed dial adjacent the periphery of the altitude dial; and altitude indicia on the marginal face of the altitude dial; a radially disposed sweep pointer connected to and rotatable with said altitude dial for registering with the air speed indicia on the altitude dial; and means supported by the housing for manually rotating the altitude dial and its associated sweep pointer with respect to the air speed dial.

2. In combination with the fixed indicia bearing airspeed dial and registering movable air speed pointer of a helicopter airspeed indicating instrument, maximum safe speed indicating mechanism comprising: an altitude dial of smaller diameter than the airspeed dial located in a superimposed concentric position adjacent and in front thereof; means supporting the altitude dial for relative rotation with respect to the airspeed dial; an arcuate slot through the airspeed dial concentric and intermediately located with respect to the peripheries of the two dials; a sweep pointer movable in said slot and projecting therethrough from behind the airspeed dial and registerable with the airspeed indicia thereon; means back of the airspeed dial rigidly connecting said sweep pointer to the altitude dial so that the two rotate together; means operably connected to the altitude dial for manually rotating it and the pointer with respect to the airspeed dial; gross weight indicia on the airspeed dial immediately adjacent the periphery of the altitude dial; and altitude indicia immediately adjacent the periphery of the altitude dial for registering with the gross weight indicia on the fixed airspeed dial, whereby when the altitude dial is rotated and an indicia mark on that dial, which indicates the current altitude at which the helicopter is flying, is caused to register with a gross weight indicia mark, which indicates the current gross weight of the helicopter, the sweep pointer registers with airspeed indicia which indicates the maximum safe speed at which the helicopter may be flown under the said current altitude and current gross weight conditions.

3. The maximum safe air speed indicating mechanism described in claim 2 in which the means rigidly connecting the sweep pointer to the altitude dial is a rotatable mounted plate type gear concentric with the altitude dial and secured thereto near their respective centers.

4. The mechanism described in claim 3 in which the means for manually rotating the altitude dial includes a rotatably mounted shaft, and a pinion gear on the shaft meshed with the teeth of said plate type gear.

5. In combination with a helicopter airspeed indicating instrument which includes a fixed dial having marginal airspeed indicia and a sweep pointer registerable with such indicia, maximum safe speed indicating mechanism comprising: a rotatably mounted dial concentric with and smaller in diameter than the airspeed dial, and rotatable in a plane parallel to and immediately adjacent the front face of the airspeed dial; altitude indicia on the face of the rotatable dial adjacent its periphery; cooperating gross weight indicia on the face of the fixed airspeed dial also adjacent the periphery of the rotatable dial, the gross weight indicia being visibly registerable with the altitude indicia; a second sweep pointer connected to and rotatable with the rotatable dial, and positioned to register with the airspeed indicia on the fixed airspeed dial; and means operably connected to the rotatable dial for rotating it to a desired setting with respect to the fixed airspeed dial.

6. In combination with a helicoptor airspeed indicating instrument which includes a fixed dial having marginal airspeed indicia and a sweep pointer registerable with such indicia, maximum safe speed indicating mechanism comprising: a rotatable mounted dial concentric with and smaller in diameter than the airspeed dial, and rotatable in a plane parallel to and immediately adjacent the front face of the airspeed dial; altitude indicia on the face of one of said dials; cooperating gross weight indicia on the face of the other of said dials registerable with the said altitude indicia as the rotatable dial is rotated; a second sweep pointer connected to and rotatable with the rotatable dial, and positioned to register with the airspeed indicia on the fixed airspeed dial; and means operably connected to the rotatable dial for rotating it to a desired setting with respect to the fixed airspeed dial.

7. A helicopter maximum safe speed computing and indicating instrument comprising: a dial bearing on its visible face spaced airspeed indicia; a cooperating dial associated member movably mounted with respect to the dial and having an appreciable surface area, said member being of such configuration and so located with respect to said dial that at least a portion of the member's surface is visible and adjacent the visible dial face regardless of the position to which the member is moved, the face of the dial and the surface of the member bearing separate and cooperably registerable sets of spaced indicia, one set relating to the helicopter altitude and one set relating to the helicopter gross flight weight; and a maximum safe indicated airspeed pointer movably mounted with respect to the dial, movable in response to movement of said dial associated member, and registerable with the airspeed indicia on the face of the dial, whereby when the said member is moved and an indicia mark thereon is brought into registery with an indicia mark on the dial face, and one such indicia mark correponds to the indicated altitude at which the helicopter is flying and the other mark corresponds to the current gross flight weight of the helicopter, the said pointer registers with an air speed indicia mark on the dial corresponding to the maximum indicated airspeed at which the helicopter may be flown under such conditions of altitude and gross flight weight.

No references cited.